Dec. 8, 1936.　　R. A. CHRISTIAN ET AL　　2,063,080

COUNTER CONTROL FOR CALCULATING MACHINES

Filed Dec. 12, 1930　　2 Sheets-Sheet 1

Inventors
Raymond A. Christian and
Emil J. Ens
By
Carl Benst
their attorney

Dec. 8, 1936.  R. A. CHRISTIAN ET AL  2,063,080
COUNTER CONTROL FOR CALCULATING MACHINES
Filed Dec. 12, 1930   2 Sheets-Sheet 2
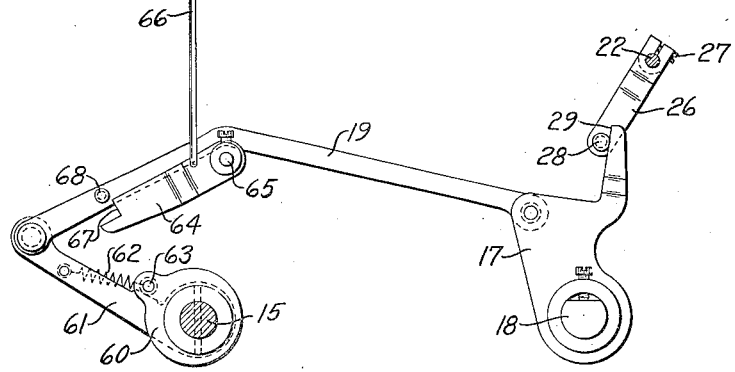
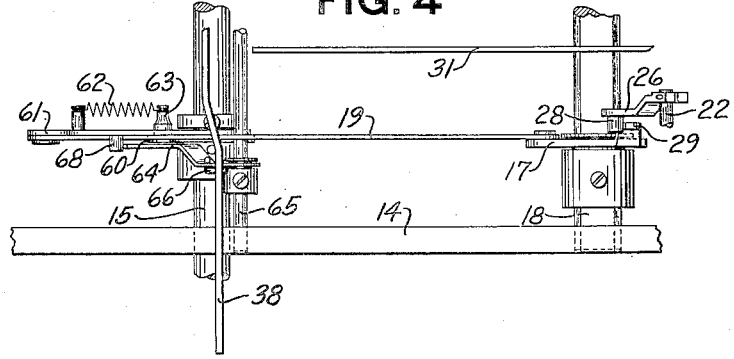
Inventor
Raymond A. Christian and
Emil J. Ens
By
their Attorney Patented Dec. 8, 1936

2,063,080

UNITED STATES PATENT OFFICE 2,063,080

COUNTER CONTROL FOR CALCULATING MACHINES

Raymond A. Christian, Dayton, Ohio, and Emil J. Ens, Newark, N. J., assignors to The National Cash Register Company, Dayton, Ohio, a corporation of Maryland Application December 12, 1930, Serial No. 501,913

10 Claims. (Cl. 235—60)

This invention relates to improvements in adding and listing machines and the like, but more particularly to the type shown and described in Letters Patent of the United States, No. 1,197,276, issued to Halcolm Ellis on September 5, 1916.

General Description

In the use of so-called accounting machines, it is sometimes necessary to keep count of a certain item connected with a transaction. For example, a telephone company has a system whereby its subscribers pay a minimum charge per month for a certain number of calls, say 75, and five cents per call for all calls over this number. It is very desirable to have a record of the number of subscribers who exceed this minimum. Through the medium of the present invention such a record can be made automatically during the computation of the subscriber's monthly bill in the following manner.

The subscriber's meter reading for the previous month is subtracted from his reading for the present month, if this difference exceeds 75, the minimum number of calls allowed, the difference between 75 and the number of calls actually made, is multiplied by five cents, the cost per call, and the product printed upon the subscriber's card. When the machine is in position to make this last entry, mechanism controlling a counting device is released and upon operation of the machine in this position "1" is added on the counting device. If the subscriber's present meter reading does not exceed his previous reading by more than 75, it is not necessary to operate the machine in this position, and consequently, the counting device remains inactive.

Thus, it will be seen that an accurate record is kept of the number of subscribers who exceed the minimum calls allowed.

Another instance of the use of the present invention, is where a department store wishes to keep a record of all the charge transactions that take place. This is accomplished in the following manner. When the operator has the machine in position to make a charge entry upon the customer's ledger sheet, the mechanism controlling the counting device is released, and upon operation of the machine, "1" is added on the counting device. Thus, an accurate count is kept of the charge transactions.

There are numerous other ways in which applicant's invention can be used to advantage.

It is, therefore, an object of this invention to provide means whereby an accurate count can be automatically kept of transactions such as described above.

Another object, is to provide means whereby the regular excursion of the driving means for a counting device will operate said counting device only at certain times.

Another object, is to provide a counting device with a driving means that is spring coupled to a regularly excursioned driving arm, and mechanism for blocking the flexible part of the driving means, thus rendering the counting device ineffective.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 3 is a side elevation showing a modified form of the mechanism involved in driving and controlling a counting device.

Fig. 4 is a top plan view of the mechanism shown in Fig. 3.

Detailed Description

Item counter actuator driving mechanism

Figure 1:
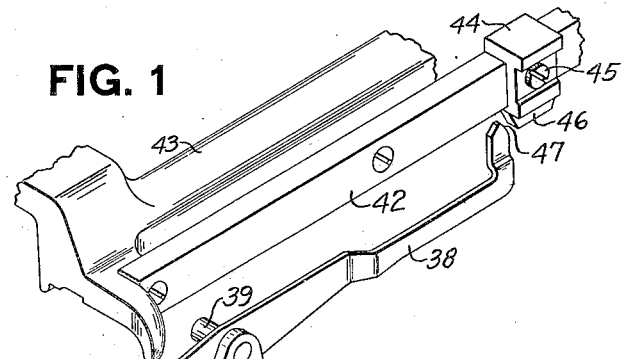
Fig. 1 is a general perspective view showing a counting device, and the mechanism involved in driving and controlling the same. In order to not obscure certain elements of Fig. 1 from view, the counter unit, per se, is shown as though the shaft has been cut in two and the counter unit set to the right, and the cut ends of the shaft are shown connected with dotted lines.

Referring to Fig. 1, shaft 15 is the main drive shaft of an accounting machine, and is shown in its normal or home position. This shaft has bearings in the machine side frames 14 (only one of which is shown, Fig. 4), and is rocked through an approximate angle of sixty degrees upon each operation of the machine, its first movement being clockwise. As the operation of this shaft is fully explained in the patent referred to above, it is thought unnecessary to go into any detailed description of its operation herein.

An arm 16, secured to the shaft 15, is connected by a link 19 to an actuator driving arm 17 loose on a shaft 18 supported in the side frames 14. Rocking movement of the shaft 15 is, through the arm 16 and link 19, transmitted to the arm 17 to drive the counter actuator, to be later described.

Item counter and actuating means

Figure 2:
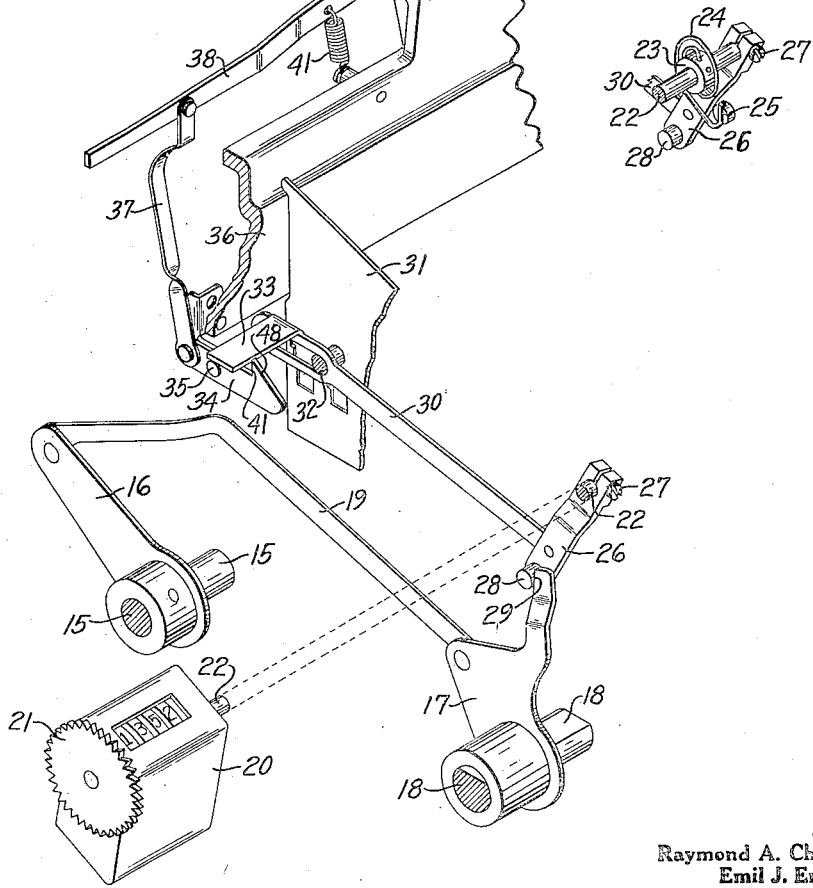
Fig. 2 is a detail perspective view showing the counter actuating mechanism.

An item counter 20, of the Veeder step-by-step type, is mounted flush with the keyboard plate between the left-hand row of amount keys, and the control keys shown in the above referred to patent. A resetting disk 21 extends through the keyboard plate where it is easily accessible for resetting the counter in the usual manner. Shaft 22 is the usual drive shaft for the item counter, and has a collar 23 (Fig. 2) secured thereto. One end of spring 24 is inserted in a hole in collar 23, and the other end is held stationary in a slotted stud 25 fastened in the counter frame. The action of spring 24 tends to constantly rotate the shaft 22 counter-clockwise. An actuator 26 is clamped to the shaft 22 by a screw 27. This screw 27 furnishes a means of adjusting an actuator drive stud 28 relatively to a finger 29 on the actuator driving arm 17.

It follows from what has been said, that, as spring 24 exerts its energy to rotate the shaft 22 counter-clockwise, the actuator 26 will likewise tend to be constantly rotated counter-clockwise to keep the stud 28 constantly in contact with finger 29. Therefore, when the arm 17 is rocked clockwise, the actuator 26 will follow said arm 17, and upon the reverse movement of the latter, the actuator 26 is carried back to its normal or home position to actuate the counter 20 to add "1" thereon.

Thus, it will be seen that for every operation of the machine "1" will be added on the item counter, unless the actuator 26 is restrained from following the finger 29.

Control of counter actuator

As previously stated, the counter 20 should be actuated only upon certain occasions, and in order to prevent the actuator 26 from functioning at each operation of the machine, means is provided to hold the actuator in its normal position so that its stud 28 cannot follow the finger 29 of the driving arm 17.

Such means will now be described. It includes a pitman 30 connected at one end to the actuator 26. The other end of the pitman 30 is slotted for support on a stud 32, carried by a usual division plate 31.

As the actuator 26 rocks back and forth, the pitman 30 follows it, sliding upon stud 32. The pitman 30 has formed thereon and at right angle thereto, a latch plate 33 cooperating with a latch 34 pivoted at 35 to a bracket fast on a tabulating frame 36. A link 37 connects the latch 34 to lever 38 pivoted on stud 39 carried by the frame 36. The lever 38 is normally held against a stop pad 40 on the frame 36, by a spring 41. This spring action is transmitted from the lever 38 to the latch 34 to hold the latter in its home position, so that its hook 49 is normally in the path of the latch plate 33, thus holding the actuator 26 inactive, the drive arm 17 traveling on alone.

A regular tabulating bar 42 is mounted on a laterally traveling carriage 43. Both the tabulating bar and carriage are common to machines of this type, and are fully explained in the above referred to patent. A tappet 44 is mounted on bar 42 by a screw 45. When the carriage 43 is tabulated to a pre-determined position, the lower end 46 of the tappet 44 strikes a finger 47 on lever 38 and rocks said lever clockwise. This movement of the lever 38 is transmitted to the latch 34 through the link 37, thus moving the hook 49 of the latch out of the path of the latch plate 33, whereupon the item counter actuator 26 is free to follow drive arm 17, and if the machine is operated at this time, "1" will be accumulated on the item counter.

There is ample clearance between latch hook 49 and latch plate 33, so that when the tappet 44 passes off the finger 47 of the lever 38, the spring 41 readily returns latch 34 to its home position where it blocks the movement of the actuator 26. Should the tappet 44 pass off of the finger 47 before the actuator 26 has returned to its home position, the back edge of the latch plate 33 will strike a cam surface 48 on the latch hook 49 and force the latch down. When the plate 33 is fully returned to its normal position, latch 34, being under spring tension, will snap back into position, thus blocking any further movement of the actuator 26.

If so desired, several tappets 44 can be arranged upon the tabulating bar 42 for operating the item counter in several predetermined positions of the carriage, or the tappets can be arranged to keep the item counter operating at all times, except in some predetermined position or positions.

Modified form

Figs. 3 and 4 show in a modified form a mechanism to drive and control the item counter 20 (Fig. 1).

In lieu of the arm 16 (Fig. 1) arms 60 and 61 connected by a spring 62 are provided. The arm 60 is secured to, and the arm 61 is loose on, the main shaft 15. The spring 62 tends to normally hold the arm 61 in contact with a stud 63 on the arm 60 so that both arms rock in unison upon movement of the shaft 15.

The link 19 connects the arm 61 with the arm 17 on the shaft 18. The finger 29 of the arm 17 cooperates with the stud 28 of the actuator 26 which is clamped to the counter shaft 22 by the screw 27. The stud 28 is held in contact with the finger 29 (Figs. 3 and 4) by the spring 24 (Fig. 2), and when the arm 17 is rocked clockwise the actuator 26 follows it so as to cause "1" to be added upon the counter 20 when the actuator 26 is restored to normal.

An arm 64, loose on a shaft 65 supported by the frames 14, is connected by a link 66 to the lever 38. The spring 41 normally holds a shoulder 67 of the arm 64 out of the path of a stud 68 on the link 19.

When tappet 44 (Fig. 1) rocks the lever 38 clockwise, as explained above, the shoulder 67 of the arm 64 is rocked into the path of stud 68. Now, when the arm 60 is rocked clockwise, the spring 62 stretches and the actuator driver 17 remains in its normal position, and therefore, the item counter actuator remains inactive.

If so desired, several tappets can be arranged upon the tabulating bar for blocking the item counter in several predetermined positions of the carriage, or tappets can be arranged to keep the item counter blocked at all times, except in some predetermined position or positions.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine having a carriage and a counting device; the combination of an actuating means for the counting device, a flexible driving means therefor, a member for blocking the flexible driving means, a lever, means for connecting said member to the lever, and means for rocking the member into position to block the flexible driving means by moving the lever.

2. In a machine of the class described having a traveling carriage, a tappet on the carriage, a counting device and actuator mechanism therefor, the combination of a regularly excursioned driving means cooperating with the actuator mechanism, means to move the actuator mechanism when the driving means is operated, a latch, a control member on one element of the actuator mechanism adapted to cooperate with the latch, a link pivoted to the latch, a lever pivoted at its middle portion to the machine frame and at one end to the link, an extension projecting upwardly from the other end of the lever, to coact with said tappet so that movement of the carriage into a predetermined position will be effective to move the latch to control the operation of the actuator mechanism when the driving means is operated.

3. In a machine having a counting device and means to control the counting device, the combination of a normally locked actuator for the counting device, a main operating shaft, driving means connected with the shaft to operate the actuator, a pitman connected to the actuator, and a latch cooperating with the pitman to lock the actuator, said first means adapted to control the counting device by moving the latch to release the pitman.

4. In a machine having a traveling carriage, and a step-by-step counting device; the combination of an actuator for the counting device; a spring coupled driving means for controlling the operation of the actuator; and a means controlled by the carriage for blocking a portion of the driving means to prevent operation of the actuator.

5. In a machine having a traveling carriage, and a step-by-step counting device; the combination of an actuator for the counting device; a spring coupled driving means for controlling the operation of the actuator, said means being positively driven when moving in one direction; and a lever controlled by the carriage, for restraining a section of said driving means to render the actuator ineffective.

6. In a machine of the class described having a traveling carriage, a tappet on the carriage, and a counting device, the combination of an actuator for the counting device, a regularly excursioned machine driving means cooperable with the actuator whereby the actuator may be operated when the driving means is cycled, a pitman pivoted to the actuator, a latch normally cooperating with the pitman to restrain the actuator from being operated when the driving means is cycled, an operating lever for said latch, and a link connecting the latch and lever, said tappet being adapted to strike and rock the operating lever to release the latch from the pitman to free the actuator for operation when the driving means is cycled.

7. In a machine of the class described having a traveling carriage, a counter, and a driving means for the machine, the combination of a counter actuating mechanism operable as the driving means is operated, a latch normally cooperable with the actuating mechanism to restrain the operation of the actuating mechanism, and carriage controlled means for releasing the latch whereby the actuating mechanism is free to operate when the driving means is operated.

8. In a machine of the class described having a traveling carriage and a counting device, the combination of a spring urged actuating means for the counter, a driving means for the machine normally restraining the actuating means against operation, a member for blocking the actuating means against operation, a lever having a projection adapted to cooperate with means on the carriage, a link connecting the lever to the member, said lever when it cooperates with the means on the carriage being operable to move the member into blocking position to prevent operation of the actuating means when the driving means is operated.

9. In a machine of the class described having a traveling carriage and a counter, the combination of means for operating the machine, an actuator for the counter, said actuator being in yielding engagement with the operating means, and a carriage controlled latch for said actuator, the effectiveness of said actuator being simultaneously controlled by the position of the latch and the cycling of the operating means of the machine.

10. In a machine of the class described having a traveling carriage and a counter, the combination of a spring urged actuating mechanism for the counter, a driving means for the machine, said driving means normally restraining the actuating means against operation, and carriage controlled means for controlling the operation of the actuator when the driving means is operated.

RAYMOND A. CHRISTIAN.
EMIL J. ENS.